United States Patent [19]
Wedelin

[11] Patent Number: 5,343,388
[45] Date of Patent: Aug. 30, 1994

[54] METHOD AND APPARATUS FOR OPTIMALLY ALLOCATING RESOURCES

[76] Inventor: Dag Wedelin, Iskällareliden 9A, S-416 55 Gothenburg, Sweden

[21] Appl. No.: 143,235

[22] Filed: Oct. 29, 1993

Related U.S. Application Data

[63] Continuation of Ser. No. 576,216, Aug. 31, 1990, abandoned.

[51] Int. Cl.$^5$ .............................................. G06F 15/20
[52] U.S. Cl. ................................................... 364/402
[58] Field of Search ................. 364/400, 401, 402, 403

[56] References Cited

U.S. PATENT DOCUMENTS

| | | | |
|---|---|---|---|
| 4,744,026 | 5/1988 | Vanderbei | 364/402 |
| 4,744,027 | 5/1988 | Bayer et al. | 364/402 |
| 4,744,028 | 5/1988 | Karmarkar | 364/402 |
| 4,914,563 | 4/1990 | Karmarkar et al. | 364/148 |
| 5,148,365 | 9/1992 | Dembo | 364/402 |

OTHER PUBLICATIONS

Garey, et al, "Computer and Intractability-A Guide to the Theory of NP-Completeness", 1979.
Rumelhart, et al, "Parallel Distributed Processing", vol. I & II, 1986.
Syslo, et al, "Discrete Optimization Algorithms" (1983).
Nemhauser, et al, "Integer and Combinatorial Optimization", (1988).
Probabilistic Networks and Optimization, Wedelin, RPT #49, May 1989, pp. 2-15.
Nyheter inom svensk programvaruut-veckling, "Framsteg Inom Vetenskap Och Teknik:," IVA, 1989, Håkan Södergren.
"Probabilistic Networks and Optimization", Dag Wedelin, Report 49, May 1989.
Nya algoritmer underlatter arbetsplanering, Dag Wedelin, CIC-News Mar. 4, 1988.
Aarts, E. H. L. and Korst, J. H. M. (1989), "Simulated Annealing and Boltzmann Machines", Wiley.
Balas, E. and Ho, A. (1979), "Set Covering Algorithms Using Cutting Planes, Heuristics and Subgradient Optimization: a Computational Study", Man. Sc. Res. Rep. 438, Carnegie-Melon Univ.
Chvatal, V (1979), "A Greedy-Heuristic for the Set--Covering Problem" Math. Oper. Res. 4,233-235.
Cooper, G. F. (1987) "Probabilistic Inference Using Belief Networks is NP-Hard", Memo KLS-87-27. Knowledge Systems Lab., Medical Comp. Sci. Group, Stanford Univ.
Geman, S. and Geman, D. (1984) "Stochastic Relaxation, Gibbs Distributions, and the Bayesian Restoration of Images", IEEE Trans. Pattern Anal. Machine Intell. 6, 721-741.
Hopfield, J. J. and Tank, D. W. (1985) "Neural Computation of Decisions in Optimization Problems. Biol. Cybern." 52, 141-152.
Hummel, R. A. and Zucker S. W. (1983) "On the Foundations of Relaxation Labeling Processes" IEEE Trans. Pattern Anal. Machine Intell. 3, 267-287.
Jensen, F. V., Olesen K. G. and Andersen, S. K. (1988) "An Algebra of Bayesian Belief Universes for Knowledge Based Systems" Research Report, Inst. of Electronic Systems, Aalborg Univ.

(List continued on next page.)

*Primary Examiner*—Roy N. Envall, Jr.
*Assistant Examiner*—Ari M. Bai
*Attorney, Agent, or Firm*—Burns, Doane, Swecker & Mathis

[57] ABSTRACT

A method and apparatus for optimizing resource allocation is disclosed which uses a probabilistic relaxation network technique for obtaining an optimal or near optimal assignment solution. A network of nodes and arcs is created. Inputs to the arcs are calculated disregarding the old outputs from the arcs, the influences on the nodes are calculated based on the inputs to the arcs and the new values for the nodes are calculated based on the influences on the node.

7 Claims, 5 Drawing Sheets

OTHER PUBLICATIONS

Lauritzen, S. L. and Spiegelhalter, D. S. (1988) "Local Computations with Probabilities on Graphical Structures and their Application to Expert Systems", J. R. Statist. Soc. B 50.

Pearl, J. (1986) "Fusion, Propagation and Structuring in Belief Networks" Artificial Intelligence 29, 241–288.

Peleg, S. (1980) "A New Probabilistic Relaxation Algorithm" IEEE Trans. Pattern Anal. and Machine Intell. 2, 362–369.

Rosenfeld, A., Hummel, R. A. and Zucker, S. W. (1976) "Scene Labeling by Relaxation Operations" IEEE Trans Syst., Man, Cybern. 6, 420–433.

Kanal, L. N. and Lemmer (eds) (1986) *Uncertainty in Artificial Intelligence* Amsterdam: North–Holland, "A Constraint–Propagation Approach to Probabilistic Reasoning", Pearl, pp. 357–369.

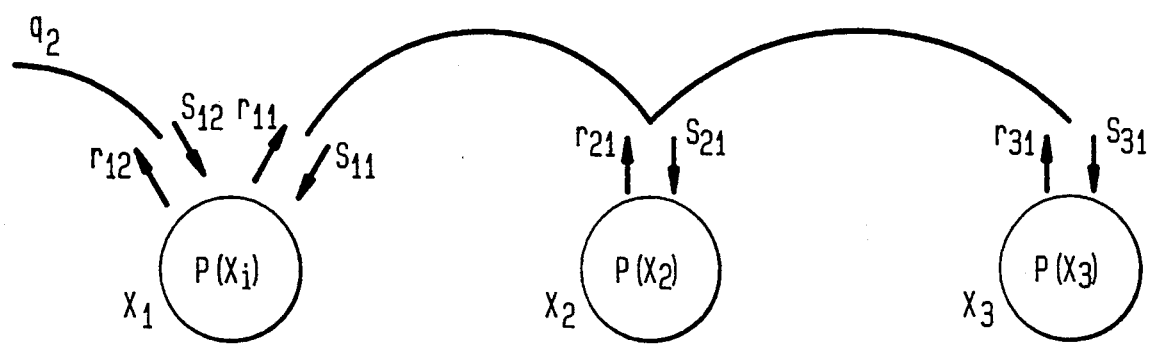
FIG. 1
FIG. 2
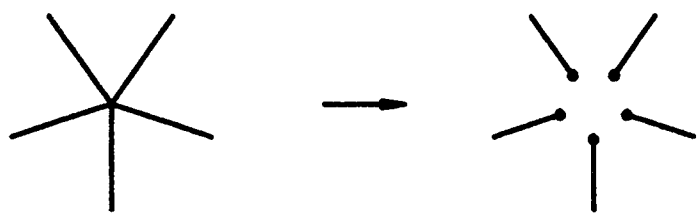
FIG. 3

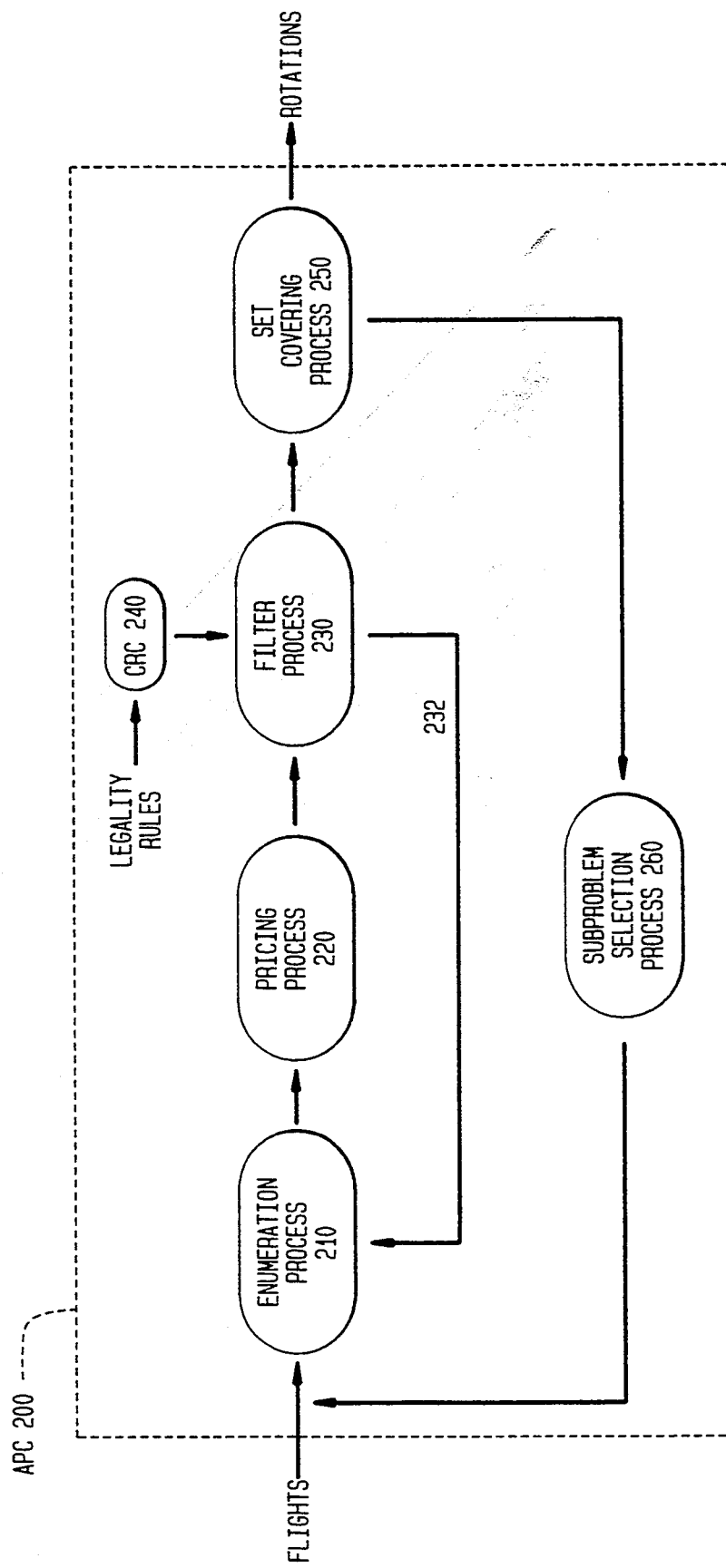

METHOD AND APPARATUS FOR OPTIMALLY ALLOCATING RESOURCES

This application is a continuation of application Ser. No. 07/576,216, filed Aug. 31, 1990, now abandoned.

BACKGROUND OF THE INVENTION

Combinatorial optimization includes well known modelling problems such as the travelling salesman problem, real World problems such as scheduling problems and various pattern recognition problems (sometimes called constraint satisfaction problems). In particular, many common industrial resource allocation problems can be defined as combinatorial optimization problems. The task is usually to minimize cost given a number of constraints that describe the restrictions of the particular situation. In some cases the variables whose values are to be chosen are continuous (such as distance, weight, etc.), and then techniques such as linear programming are used. Often however, the entities to be determined are discrete, due to the fact that people and machines are indivisible, and cannot be assigned in fractions. Because of the combinatorial explosion, such problems are extremely difficult to solve optimally within a reasonable amount of time and they can often be proved to be NP-hard. For small problems exhaustive search may be possible, but for larger problems this is not possible. Certain problems may belong to a special case or allow for decomposition into smaller problems.

Examples of established methods are local optimization, selective combinatorial search, heuristics and integer linear programming. Hybrid methods are also sometimes used. Some methods, such as integer linear programming, emphasize the search for optimal solutions. Other methods, such as heuristics and probabilistic relaxation, try to find good but possibly suboptimal solutions. This is the most suitable approach for very large problems, since exact methods often fail to find a solution at all, while in practice it is often satisfactory to find suboptimal solutions.

Integer programming methods, which seem to be the most favored current approach, differ from intelligent search methods in the sense that they relax the integer constraints and instead work, with real valued, continuous variable. By doing so, linear programming techniques may be used to give continuous approximations to the combinatorial problem, from which integer solutions may sometimes be deduced. Examples of linear programming approaches can be found in U.S. Pat. Nos. 4,744,026, 4,744,027, 4,744,028, and 4,914,563.

Another possibility is to use the approach of neural or connectionist networks. There exists a wide variety of neural net architectures, although they all share some basic characteristics. The computation is distributed over a large number of nodes in a network, with each node working independently of the other nodes, only exchanging information with its neighbors in the network. The topology of the network may or may not reflect the specific problem to be solved. In some cases, the variables are allowed to vary continuously. In other networks, such as Boltzmann machines, the variables are discrete, and the network finds a solution by stochastically moving between different states guided by a method called simulated annealing.

The present invention is designed to provide a faster, more efficient approach to solving combinatorial optimization problems.

SUMMARY OF THE INVENTION

The probabilistic network to be described is based on a technique called probabilistic relaxation. The term "probabilistic" is motivated by the use of numbers between 0 and 1 which are used and interpreted more or less as probabilities. The assignments are found by an iterative procedure beginning with an initial guess where each node is assigned a number between 0 and 1 indicating an initial preference as well as an uncertainty. The iteration proceeds by adjusting the node values with respect to the constraints until the numbers converge to 0 or 1 giving the final assignment In the iteration step, the constraints are checked many times over, in sequence or in parallel. Each check changes the values for the variables affected by the current constraint and makes them consistent with this constraint. This is done disregarding other constraints that are therefore "relaxed". The local and parallel characteristics of the iteration makes it possible to do the computations in a network, emphasizing the structure of the computation.

To solve a combinatorial problem with this approach, the appropriate variables and constraints must be specified, together with an objective function to be minimized or maximized. The network for the problem is uniquely defined by these variables and constraints. Each node in the network corresponds to a variable and each arc corresponds to a constraint, so the topology of the network directly reflects the structure of the problem. The network is iterated until it reaches a stable state, giving the proposed solution. If the network does not contain cycles, it will be able to solve the problem optimally in a time proportional to the size of the network. In almost all cases, however, the network will contain cycles and will in general find suboptimal solutions. Special techniques have to be applied to ensure that the network reaches a stable state and does not continue to oscillate forever.

The actual computation that the network according to the present invention performs is to compute (or approximate) the marginal distributions of a probability distribution over n discrete finite variables $$p(X) \propto \prod_{k=1}^{m} q_k(X_k) \qquad (1)$$

where $\propto$ denotes proportionality. Each potential $q_k(X_k)$ is determined by a constraint and $X_k$ is the subset of variables active in the constraint. This distribution is constructed so that the solution of the problem can easily be determined from the marginal distributions.

An important feature of probabilistic relaxation is its ability to find solutions which agree well with the constraints without explicit search of the space of possible solutions. Contrary to previous probabilistic relaxation approaches, this network is not sensitive to initial assignments and the order of iteration. Since the network is not restricted to finding an optimal solution, it is able to give good solutions to very large combinatorial optimization problems (with several million variables), that cannot be solved by existing methods. The network is fast also when it simulated on a standard computer. It also allows direct use of constraints that include more than two variables, in contrast to existing neural network methods.

In a preferred embodiment of the present invention, a method of optimally assigning available resources and available facilities is provided comprising the steps of creating a network of nodes and arcs, the arcs connecting various ones of the nodes, where the nodes correspond to assignments of a resource and a facility and the arcs correspond to constraints on the assignments, iteratively performing the following steps until a stopping criteria is reached representing that the network is in a stable state:

calculating inputs to the arcs $r_{ik}(x_i)$ disregarding the old outputs from the arcs $s_{ik}(x_i)$;

calculating the influences on the nodes $s_{ik}(x_i)$ based on the inputs to the arcs $r_{ik}(x_i)$; and calculating the new values for the nodes $p(x_i)$ based on the influences on the nodes $s_{ik}(x_i)$, and allocating the resources and facilities in accordance with the stable state reached by the network.

BRIEF DESCRIPTION OF THE DRAWINGS

The invention of the present application will now be described in more detail with reference to the preferred embodiments of the apparatus, given only by way of example, and with reference to the accompanying drawings, in which:

FIG. 1 is a schematic illustration of the basic components in the network;

FIG. 2 illustrates the fixation method for convergence;

FIG. 3 illustrates a crew assignment problem according to the present invention;

FIGS. 4A and 4B are a flowcharts illustrating a module for establishing a set of pairings in accordance with the present invention;

DETAILED DESCRIPTION OF THE PREFERRED EMBODIMENTS

Figure 5:
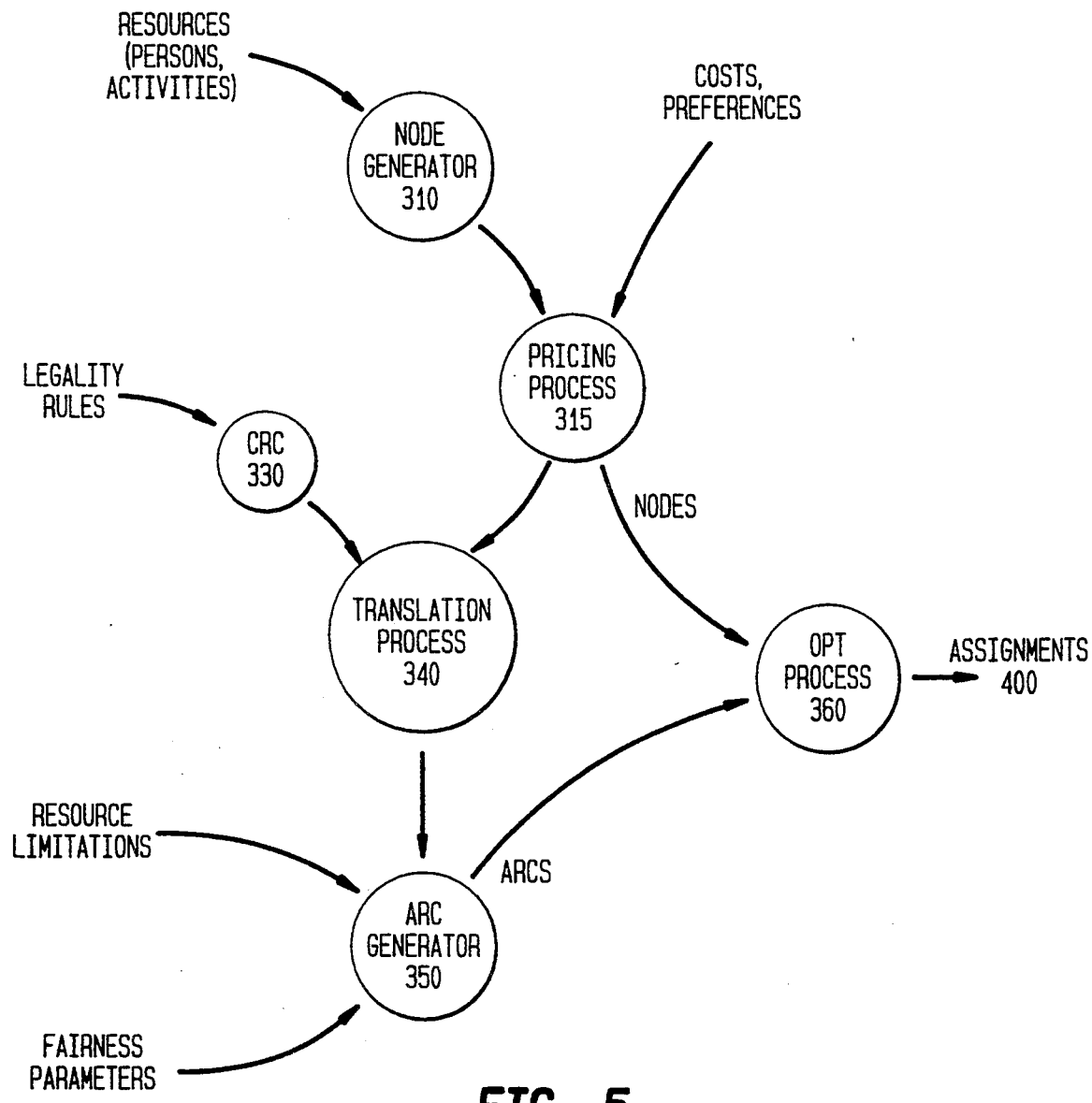
FIG. 5 is a flowchart illustrating a module for resource allocation in accordance with the present invention.

The theory on which the present invention is based is published in Wedelin, "Probabilistic Networks and Combinatorial Optimization", Report 49, Programming Methodology Group, University Of Goteborg and Chalmers University of Technology, May 1989, publicly available September, 1989. This paper is incorporated by reference herein.

To be able to discuss the network in detail, first, a description of the kind of problem the network attempts to solve is in order. Further, the formulation of how optimization problems in this context will be discussed. Finally, the network according to the present invention will be described. Consider a special class of probability distributions over n discrete finite variables $X=(x_1, \ldots x_n)$. The variables $x_i$ will in the most important case be binary so that $x_i \epsilon \{0,1\}$ but may also take an arbitrary finite number of discrete values. The probability distributions will be of the form $$p(X) \propto C \prod_{k=1}^{m} q_k(X_k)$$

where each $q_k(X_k)$ is a nonnegative function of a subset $X_k$ of the variables $x_1, \ldots x_n$. The functions $q_k(X_k)$ will be called the potentials of $p(X)$. The normalization constant is chosen so that $p(X)$ satisfies $$\sum_X p(X) = 1$$

where a simplified notation is used to indicate that the summation should be performed over all possible values of configurations of X, in the binary case $2^n$ configurations. The constant C is never calculated so the following equation can be used:

$$p(X) \propto \prod_{k=1}^{m} q_k(X_k) \qquad (2)$$

where $\propto$ denotes proportionality.

To describe the structure of $p(X)$ it is useful to associate with $p(X)$ an undirected hypergraph with n nodes and m arcs. Each node corresponds to one of the variables $x_i$ and each arc corresponds to a potential $q_k$. In a hypergraph an arc is allowed to connect to more than two nodes. Most other basic definitions generalize intuitively from ordinary graphs.

In the present case, the arc corresponding to $q_k$ should be connected to all of the nodes in $X_k$. Arc $q_k$ is then connected to node $x_i$ if and only if $q_k$ depends on the variable $x_i$. For simplicity, an arc will also be allowed to connect to only one node if $q_k$ for some k depends on only one variable.

A relevant property of this hypergraph is whether it contains any cycles or if it is acyclic. A cycle is a path over the arcs from a node back to itself through a sequence of other nodes. If the hypergraph contains no cycles it is a hypertree.

The probability distribution $p(X)$ is said to have a Markov property with respect to the hypergraph since $$p(x_i | X \setminus x_i) = p(x_i | N_i)$$

where $N_i$ denotes the set of neighbors to $x_i$. This means that the conditional probability for $x_i$ given all other nodes in the system depends only on those nodes that are neighbors to $x_i$ in the graph.

These conditional probabilities are local properties of $p(X)$ and are calculated from the potentials. In fact, $p(X)$ may be defined by specifying the functions $p(x_i | N_i)$.

On the other hand, it is general extremely difficult to calculate global properties of $p(X)$ such as the marginal probabilities over a subset of the variables. It is also difficult to generate random samples from $p(X)$. In particular, the marginal probabilities $$p(x_i) = \sum_{X \setminus x_i} p(X) \qquad (3)$$

are difficult to calculate except in special cases. The summation should be performed over all configurations of the variables in X except $x_i$. In principle, the calculation is trivial but it suffers from the combinatorial explosion when n is large.

The network to be presented attempts to approximate these marginals. The network has the same topology as the graph for $p(X)$, and gives exact answers in the special case when the graph is acyclic. For unrestricted graphs the approximate results that can be obtained turn out to be useful in practice.

TRANSFORMATION OF THE PROBLEM

To solve a combinatorial optimization problem with probabilistic relaxation, a function $\underline{p'(X)}$ is defined of the form (2) so that maximization of $\underline{p'(X)}$, $$\max p'(X)$$

becomes equivalent to solving the optimization problem. Combinatorial optimization problems are usually stated in terms of an objective function to be maximized or minimized subject to a number of constraints. By choosing the potentials appropriately, a wide range of combinatorial optimization problems can be represented.

For example, if the problem involves maximization of a linear function $\underline{c(X)} = \Sigma_i \underline{c}_i \underline{x}_i$ then each term in the sum contributes to a potential $$q(x_i) = e^{c_i x_i}$$

in $\underline{p'(X)}$. A constraint over a set of variables $X_k$ is conveniently represented by $$q(X_k) = \begin{cases} 1 \text{ if constraint satisfied} \\ 0 \text{ otherwise} \end{cases}$$

which makes $\underline{p'(X)} = 0$ when the constraint is not satisfied.

Now define $$p(X) \propto p'(X)^{\frac{1}{T}}$$

where T is a positive "temperature" constant. The notion of temperature has been inspired by the ideas of simulated annealing (see Gemean et al, "Stochastic Relaxation, Gibbs distributions, and the Bayesian restoration of images", IEEE Trans Pattern Anal. Machine Intell. 6, pp. 721–741 (1984)) although an annealing schedule is not used herein. In a preferred embodiment of the present invention, T is set to a value in the range of 10E-20 to 10E-1, that is, 0.00000000000000000001 to 0.1). T is kept at a constant value throughout the iteration process. A change in temperature from 1 to T modifies the potentials from $\underline{q'_k(X_k)}$ to $$q_k(X_k) = q_k'(X_k)^{\frac{1}{T}}$$

The function $\underline{p(X)}$ can be maximized instead of $\underline{p'(X)}$ without changing the problem. Choosing $T<1$ "sharpens" $\underline{p(X)}$ so that differences in magnitude become exaggerated compared to those of $\underline{p'(X)}$. If T is chosen to be sufficiently near 0 then the maximum value of $\underline{p(X)}$ will be arbitrarily near 1 and the sum of $\underline{p(X)}$ over all other configurations will be negligible since $\underline{\Sigma_X p(X)} = 1$. If the maximum of $\underline{p(X)}$ should not be unique it can usually be handled by a slight perturbation of the problem. This perturbation would be created by the addition of a random noise to the costs in the problem. The amplitude of the noise is about 1/10000 of the costs and does not affect the solution.

Calculation of the marginal probabilities of $\underline{p(x_i)}$ will now solve the optimization problem. Since the maximum value of $\underline{p(X)}$ dominates over all other values, the optimal configuration can be read directly from the $\underline{p(x_i)}$ by solving the trivial maximization problems $$\max p(x_i)$$

for each variable. In practice $\underline{p(x_i)}$ will be near 1 for the right answer and near 0 otherwise.

If the $\underline{p(x_i)}$ are calculated directly from their definition in equation (3) the procedure is no better than the simple approach of testing the value of $\underline{p(X)}$ for all possible configurations. However, if the marginal probabilities could be calculated or approximated efficiently the situation would be quite different.

THE PROBABILISTIC NETWORK

The basic idea of the network is illustrated in FIG. 1. In the network, the $\underline{p(x_i)}$ are entities in the nodes while the $\underline{s_{ik}(x_i)}$ and $\underline{r_{ik}(x_i)}$ constitute a kind of flow through the arcs. Each arc receives input $\underline{r_{ik}(x_i)}$ from all its nodes and produces output $\underline{s_{ik}(x_i)}$ to these nodes in accordance with the equation $$s_{ik}(x_i) \propto \sum_{X_k \ x_i} q_k(X_k) \prod_{j, x_j \in X_k \ x_i} r_{jk}(x_j) \quad (4)$$

If $q_k(X_k)$ depends only on the single variable $x_i$, that is $q_k(X_k) = q_k(x_i)$, this equation simplifies to $$s_{ik}(x_i) \propto q_k(x_i) \quad (5)$$

Each node calculates its value $\underline{p(x_i)}$ from its inputs by the equation $$p(x_i) \propto \prod_{k, x_i \in X_k} s_{ik}(x_i) \quad (6)$$

and its output to the arcs by $$r_{ik}(x_i) \propto \frac{p(x_i)}{s_{ik}(x_i)} \quad (7)$$

Each node collects its influences $\underline{s_{ik}(x_i)}$ and keeps $\underline{p(x_i)}$ and $\underline{r_{ik}(x_i)}$ consistent with equations (6) and (7). The network can therefore be in a stable state only when it satisfies these equations. A change in the output $\underline{s_{ik}(x_i)}$ from an arc to a node results in a change of the current value of $\underline{p(x_i)}$ for that node and also in the inputs $\underline{r_{ik}(x_i)}$ to the other arcs. This may in turn cause changes for other nodes. All calculations are local in the sense that they involve only one arc and its nodes.

In principle, the updating of the variables in the network could be performed continuously in time. In discrete time, one iteration of the network is defined as one update of all the influences in the network. It is also convenient to define a special initialization step that updates only influences of the simple form of equation (5). This step involves almost no calculation since the values can be read directly from the potentials.

When the network is acyclic these formulas uniquely define the $\underline{p(x_i)}$ as the marginals of equation (2).

THE ARC ITERATION

An arc iteration updates the influences from one particular arc to all its nodes and may to a large extent be parallelized. The arcs can be updated in parallel with the exception that adjacent arcs should not be iterated at exactly the same time.

The reason for defining the arc iteration is that the influences can be more efficiently calculated when they are calculated together in this way. In the method according to the present invention, the $\propto$ sign should be interpreted as an assignment operator. This assignment performs in dependence on the functions $p(x_i)$, $r_{ik}(x_i)$, and $s_{ik}(x_i)$. Before the iteration begins, all the variables should be initialized to the uniform distribution ($\propto 1$) and, if possible, according to equation (5).

For all k (in parallel):

1. For all $i, x_i \epsilon X_k$ (in parallel):

$$r_{ik}(x_i) \propto \frac{p(x_i)}{s_{ik}(x_i)}$$

2. For all $i, x_i \epsilon X_k$ (in parallel):

$$s_{ik}(x_i) \propto \sum_{X_k \setminus x_i} q_k(X_k) \prod_{j, x_j \epsilon X_k \setminus x_i} r_{jk}(x_j)$$

3. For all $i, x_i \epsilon X_k$ (in parallel):

$$p(x_i) \propto r_{ik}(x_i) s_{ik}(x_i)$$

The above method according to the present invention accomplishes the following steps. Step 1 calculates the input $r_{ik}(x_i)$ to the arc by dividing away the old output from the arc, that is, the old influences on the node, from the current value of $p(x_i)$. Step 2 does the actual updating of the influences and step 3 calculates the new values of $p(x_i)$.

For a hyperarc, the most critical part of the calculation is the sum over all the configurations of $X_i \setminus x_i$. In general, this calculation will be exponential in the number of variables in $X_k$. For many simple functions $q_k(X_k)$, however, the time needed for calculation of the influences from an arc in step 2 can be made linear in the number of variables. One common case is when $q_k(X_k)$ contains only relatively few non-zero values such as for example, a function that is 1 if and only if exactly one of the argument variables is 1 and 0 otherwise. Other possibilities are that the function shows some kind of symmetry so that the sums may be calculated without explicit summation or that it can be written as the sum of other functions that are simple. As a last resort, one may even attempt to approximate the sums.

FORCING THE NETWORK TO CONVERGE AND RESOLVE

Whether or not the network converges depends entirely on the kind of problem to be solved. For a problem giving an acyclic network, convergence is guaranteed after a finite number of steps. For some other problems, such as the assignment problem, convergence is also reached in a finite number of steps. For other more difficult problems, there will be no convergence, or only partial convergence in the sense that a subset of the network becomes stable. In particular, when a subset of the network yields stable results in several successive iterations, the subset is said to have converged for purposes of the present invention. The number of iterations needed for convergence with the herein described methods depends on the particular problem instance but typically lies in the range of fifty to several hundred iterations.

The basic idea considered so far for making the network converge is to adjust the potentials for single variables, $q(x_i)$, as little as possible so as to give a simpler problem that does converge. This is equivalent to dynamic manipulation of the cost for each variable since $$q(X_i) = e^{c_i x_i}$$

The adjustment can be done in two basic ways, by fixing nodes to determined values (setting a very high or low cost) or by continuous adjustment.

The first method decides a specific cost of some node based on preliminary information that can be obtained from the unresolved or oscillating network. For example, if a binary variable $x_i$ is fixed to 1 then the potential $q(x_i)$ is set to $q(x_i=1)=1.0$ and $q(x_i=0)=0.0$ After this fixation of the node, the modified network is iterated in order to adjust for the change. This process is then repeated until all nodes are stable and resolved. The stabilizing effect of fixation is due to the fact that it eliminates the interaction through the fixed node since $r_{ik}(x_i) = q(x_i)$ for all k. This effectively splits the network at the fixed node into several separate nodes with the same value, see FIG. 2. The number of cycles is reduced and eventually after repeated fixation, the network will contain no cycles and convergence is guaranteed. This method also provides a means for resolving a converged but unresolved network and thus makes the introduction of random costs unnecessary.

The other basic method to make the network converge is to change the potentials $q(x_i)$ continuously in small steps after each iteration so that the belief in the current values of $b(x_i)$ is strengthened, where $b(x_i)$ is the result of the unrestricted network. This eliminates the possibility of arriving at an entirely false solution and is more in the spirit of the network approach. In a preferred method, this is accomplished by modifying equation (7) in step 1 of the method to $$r_{ik} \propto \frac{p(x_i)}{s_{ik}(x_i)^\alpha}$$

where $\alpha < 1$.

As noted above, the present invention is applicable to a number of real world problems in which it is necessary to match resources and tasks within a system, subject to constraints. One such application is in the field of airline resource management. Other applications of the present invention include the fields of pattern recognition, VLSI design, expert systems, and production planning. Although the present invention may be applied in these, and other, fields, the following discussion will focus on the airline resource management application.

Once a flight table has been constructed, an airline has to make sure that each flight will be provided with a crew. The schedules must comply with the general safety regulations, the company's own internal operating policies and the union requirements, while minimizing total cost. These requirements for a valid schedule constitute the constraints in the network. The present invention can be used to determine crew pairing construction and crew assignments. Further, the invention can be used to assess future crew requirements by allocating crew rotations.

One step of the present invention in solving the airline resource management problem is to assign activities to the personel. This problem can be formulated by a matrix where persons are lined up against activities as shown in Table 1.

TABLE 1

| | JOB ROTATION | | | |
|---|---|---|---|---|
| | R1 | R2 | R3 | R4 |
| Mr. Brown | 6 | 5 | 8 | 7 |
| Mr. Green | 3 | 8 | 7 | 10 |
| Mr. White | 4 | 1 | 5 | 9 |
| Mr. Black | 5 | 6 | 4 | 6 |

Each entry in the matrix corresponds to a possible assignment. Each assignment is given a gain $q(i,j)$ and only one activity can be assigned to each person and only one person on each activity. By introducing variables $x(i,j)$, where $x(i,j)=1$ if person i is assigned to activity j, and otherwise, 0, a formal statement of the problem can be expressed as follows:

$$\text{maximize} \sum_i \sum_j g(i,j)x(i,j)$$

Subject to:

$$\sum_j x(i,j) = 1 \text{ for all } i$$

$$\sum_i x(i,j) = 1 \text{ for all } j$$

$$x(i,j) = 1 \text{ or } 0$$

TABLE 2

| | JOB ROTATION SOLUTION | | | |
|---|---|---|---|---|
| | R1 | R2 | R3 | R4 |
| Mr. Brown | 6 | 5 | <u>8</u> | 7 |
| Mr. Green | 3 | <u>8</u> | 7 | 10 |
| Mr. White | 4 | 1 | 5 | <u>9</u> |
| Mr. Black | <u>5</u> | 6 | 4 | 6 |

In the solution shown in Table 2, Mr. Brown is assigned to rotation 3, Mr. Green to rotation 2, Mr. White to rotation 4, and Mr. Black to rotation 1. $x(1,3)=1$, $x(2,2)=1$, $x(3,4)=1$, $x(4,1)=1$, all other x are zero. The total gain is $$g(1,3)+g(2,2)+g(3,4)+g(4,1)=8+8+9+5=30$$

and the mathematical theory for linear programming indicates that this is optimal.

A natural generalization of this problem is to allow more than one person on each activity. Thus, the "capacity" of the activity is increased. Additionally, it may be preferrable to limit the capacities on groups of activities. Activities may occur in many variants, out of which only a few have to be used.

$$\sum_{i,j \in S} x(i,j) \leq \text{capacity for all and all activity groups } S.$$

It might be an objective to "fill" all capacity constraints to their limits. As far as possible, all rotations are to be supplied with a crew. Therefore, a "slack variable" is introduced representing the remaining capacity of the constraint. If this variable is given a large cost in the objective, the method according to the present invention will work hard to assign persons until the slack is zero.

$$\sum_{i,j \in S} x(i,j) + C \cdot y = \text{capacity for all activity groups } S.$$
$$y > 0$$

C is a negative term in the objective and y is an extra variable. In order to obtain a solution with a high gain, y must be small. This guarantees that a lot of assignments are made. The values of the numbers C are entered in a way that reflects the desire to "pack" to schedule. A large negative C means dense packing.

In application of the method to real life problems, it may not be satisfactory only to assign more than one person to each activity. It may also be desirable to assign more than one activity to each person. However, activities assigned to the same person must fulfill a number of requirements, that is, satisfy a number of constraints. The most fundamental of these requirements is that no activities assigned to the same person may occur at the same time. This provides a set of "collision constraints":

$$\sum_{j \in S} x(i,j) \leq 1 \text{ for all persons } i \text{ and all subsets } S.$$

Each subset Sk contains activities colliding at some specific moment. Around seven such critical moments are usually sufficient to cover all collision possibilities in a 14 day schedule.

Each activity has a number of "ingredients" whose distribution among the employees must be controlled. For example, it may be desirable to ensure variation in each individual schedule by giving upper bounds on the number of stops at certain airports. Another restriction of the same type would be to require a minimum amount of flight time with a certain aircraft type. Of course, the total workload must also be under control.

In order to take care of these requirements, general linear constraints are introduced with soft bounds in the system. These will have the form:

$$1 + C \cdot Y(i) \leq \sum_j a(j)x(i,j) \leq u + C \cdot Y(i)$$

The numbers a(j) correspond to the halt of the ingredient in activity j and Y is a variable allowing the bounds to be exceeded at a cost C. Y is called an artificial variable. A large negative number C will push the solution into the inside of the bounds.

Another factor to be considered is the requirements of union contracts which impose non-linear constraints. "Provided that a person is assigned an activity of type A, he should be allowed an activity of type B within two weeks." This type of rule can be handled by quadratic combinatorial constraints. Individual costs are set on each of the four possible scenarios:

1. Mr. X is assigned none of the activities;
2. Mr. X is assigned an activity from A;
3. Mr. X is assigned an activity from B;
4. Mr. X is assigned activities from both A and B.

A typical union contract would recommend case 1 or 4. Case 2 and 3 would be illegal. This is not linear.

These various constraints, as well as other appropriate for the industry, are used in solving the resource allocation problem as follows.

The crew assignment problem will now be discussed with respect to the iterative method of the present invention in connection with FIG. 3, where the rows are the people in the crews and the columns are the different flight rotations and activities. Only a few people and activities are shown for simplicity. Each entry in the table corresponds to a node in the network. Arcs are formed between the entries which reflect the constraints placed on the system. For example, due to airline regulations, at least 3 people must be assigned to each rotation. Therefore, arc A1 constitutes the constraint $\Sigma x_i \geq 3$. With respect to the constraints on the rows, clearly, each person can only be in one place at a time therefore $\Sigma x_j \leq 1$. Other constraints are determined based, for example, on union rules which proscribe how many days in a row a crew member is allowed to work, how much training he/she must have, employee preferences, vacations, etc., as discussed above.

The table of FIG. 3 relates to the equations (1), (2) and (3) in the following manner. In the aforementioned equations, the "arcs" of the table of FIG. 3 are indexed k. The index k in these equations refers, for example, either to a constraint requiring that a person is assigned exactly n activities (arc A2 in FIG. 3), or a similar constraint requiring that each activity is assigned exactly m persons (arc A1 in FIG. 3). To understand the meaning of $r_{ik}(x_i)$, $s_{ik}(x_i)$, $p(x_i)$, it is assumed that k corresponds to an arc requiring that a person should be assigned exactly n activities. The index i then corresponds to the activities. $p(x_i)$ is the probability that person k should have the activity i. It is this number that is actually listed in the table of FIG. 3. $s_{ik}(x_i)$ is the influence on this probability from this particular arc. That is, the requirement that the person k should have exactly n activities has a certain impact on p which is stored in s. $r_{ik}(x_i)$ is the input from p to arc k where the influence $s_{ik}(x_i)$ from arc $\underline{k}$ to p is cancelled from $\underline{p}$.

An apparatus for implementing the method according to the present invention will now be described. In a preferred embodiment of the present invention, the apparatus is embodied as a computer program adapted to run on a programmed computer. It is understood that various hardware circuitry may be substituted for all or parts of the computer program without departing from the scope of the invention.

FIG. 4A illustrates a flow-chart of the APC 200 module which uses the probabilistic relaxation network method according to the present invention. The APC 200 module takes single flight legs as input and produces rotations as output so as to minimize the total cost of the rotations. A rotation is a sequence of flight legs starting and ending at the home base of the crew.

FIG. 4B is a flow-chart illustrating the basic components of the APC 200 module. The Enumeration Process 210 takes flights as input and produces rotations as output. Each rotation is then priced by the Pricing Process 220. The Pricing Process 220 uses actual costs for salaries, hotel rooms, ground transportation, etc. to determine the accurate cost of each rotation. The rotations are then piped to a Filter Process 230 which sorts out illegal rotations. A feedback loop 232 from the Filter Process 230 to the Enumeration Process 210 is used to control the Enumeration Process 210 and increase the ratio of legal to illegal rotations flowing from the Enumeration Process 210 to the Filter Process 230. The specific operation of the Filter Process 230 is application dependent and depends directly on the legality rules defined for the application. The CRC 240 reads a file from a memory storage area (not shown) where the legality rules are stored for the particular application and assembles the Filter Process 230.

The rotations which pass the Filter Process 230 are piped to the Set Covering Process 250 which uses the probabilistic relaxation network method according to the present invention. Here, each rotation corresponds to a "node" and each flight is associated with an arc in the probabilistic network. The arcs q require that each flight have at least one crew. There is also a penalty for assigning more than one crew.

Since the enumeration process can not be complete (it would result in too many rotations), the resulting rotations from the Set Covering Process 250 are examined by a Subproblem Selection Process 260 which selects a subset of rotations which can be improved. These are passed back to the Enumeration Process 210 which is complete for smaller subproblems. The enumeration process is complete when all possible rotations have been enumerated. When no improvement is encountered in several consecutive subproblem runs, the program terminates. The number of consecutive runs in which the stability occurs is application dependent as described above with respect to network convergence. At the termination of the program, the values of $\underline{p(x_i)}$ of the last iteration constitute the optimal or near optimal set of rotations based on the constraints of the industry.

The resulting rotations may then be matched with the airline personel in a second program module shown in FIG. 5. This second program module also uses the probabilistic relaxation network method according to the present invention. This module inputs resources such as persons and activities (that is, rotations) and outputs assignments according to which persons are assigned to tasks. The resources are passed to a Node Generator 310 which generates a node for each possible assignment. Nodes corresponding to assignments which are illegal are not generated. The nodes are passed to a Pricing Process 315 which takes personal preferences and costs as input and performs the determination of the potentials.

Legality rules are passed to the CRC Process 330 which produces code for determining if a combination of assignments is allowed or not. This code, together with the nodes are passed to the Translation Process 340 which uses the various techniques to translate the legality rules to computable q-functions. The techniques will be described in detail later. The Arc Generator 350 then uses this information to feed the probabilistic network with arcs. As input, the Arc Generator 350 also takes information about resource limitations and some strategic information such as penalties on unfair schedules. This information results in more capacity and configuration arcs. The nodes and the arcs together constitute the probabilistic network which is passed to the Optimization Process 360. The Optimization Process 360 performs the steps (1)–(3) described above to obtain an optimal or near optimal assignment of personel to tasks. The optimal or near optimal assignments, determined from the values of $\underline{p(x_i)}$ of the last iteration, constitute an allocation of resources and facilities which minimizes the costs of such allocation.

Figure 6:
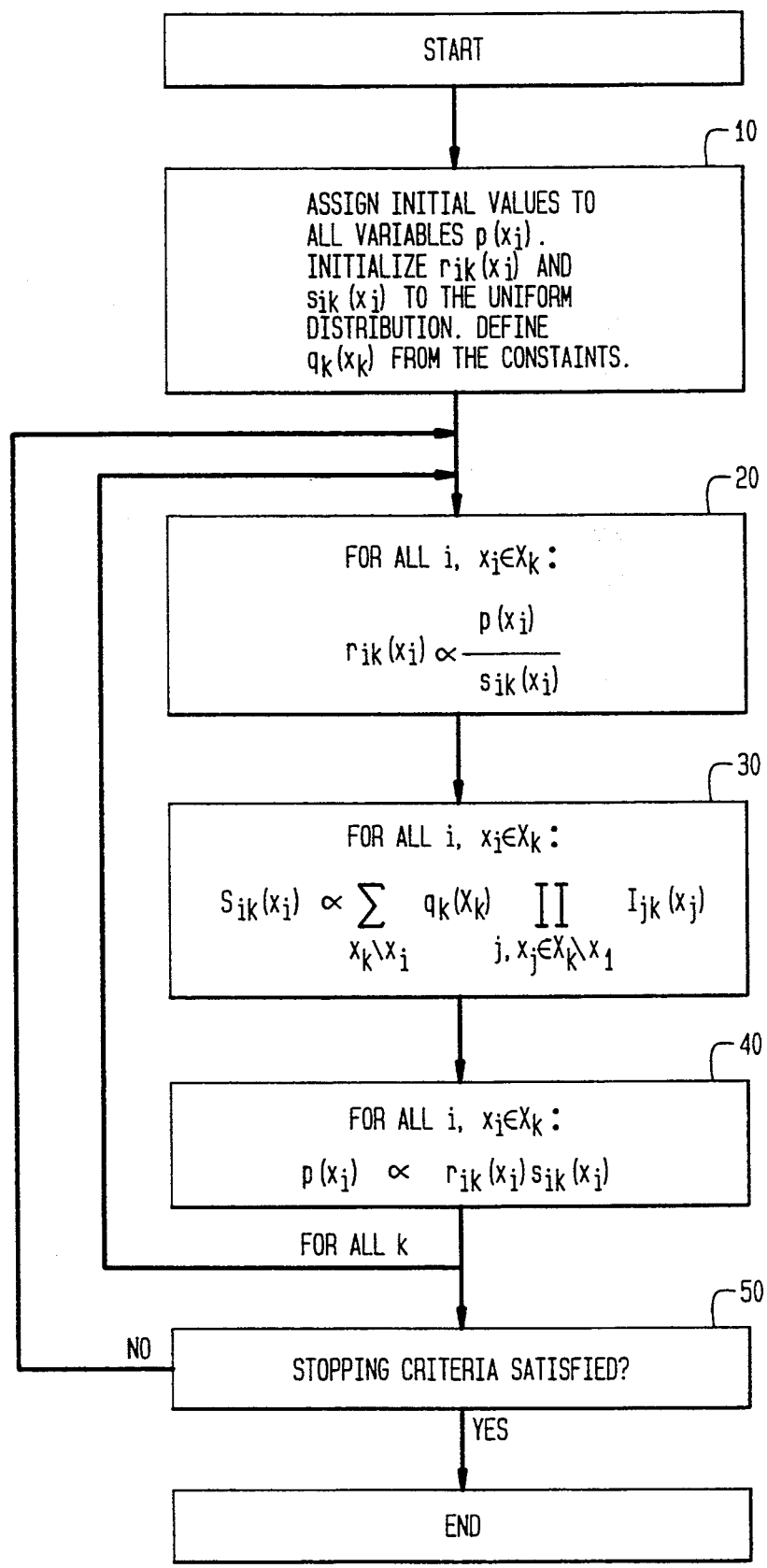
FIG. 6 is a block diagram illustrating an apparatus according to the present invention.

As shown in FIG. 6, certain legality constraints are input into Preprocessor 100, which then outputs capacity constraints and variables. These capacity constraints and variable are then input into the R Process 120. The Preprocessor 100 of FIG. 6 corresponds to the elements of FIG. 4A that preceed the Set Covering Process 250 and the elements of FIG. 5 that preceed the Optimization Process 360. Correspondingly, the Set Covering Process 250 and the Optimization Process 360 call a routine which implements the R Process 120 through the Stopping Criteria Process 150 of FIG. 6.

The legality constraints consist of, for example, restrictions on work time etc. as described in union, government and company agreements as described above. These can be extremely complex from a mathematical point of view and must be transformed to a form that can be efficiently computed. "Efficiently computed" refers to the situation where the q-function corresponding to the constraint should be possible to represent in such a way that step (2) of the three-step procedure discussed above can be performed in linear time.

The capacity constraints are constraints limiting the capacity of a certain resource. For instance, the resource rotation 1 from FIG. 3 is limited by constraint (arc) A1 to take no less than 3 persons. Mathematically this implicates that the sum of four binary variables is equal to or greater than three. A capacity constraint is thus a special case of a q-function that can be efficiently computed. Another type of q-function used by the apparatus of the present invention is the "configuration arc". In this arc, single configurations of variables can be associated with a cost.

Depending on the specific application of the method and apparatus of the present invention, one or more of the following techniques are used to translate legality constraints into "computable q-functions".

A new variable can be generated for each configuration of variables that is "legal" according to a set of legality constraints. This approach is appropriate when the set of legality constraints can be partitioned into subsets where each subset is connected to a small subset of the variables, since all configurations of the variable subsets can be listed. Each set of legality constraints in the old variables will then give rise to one linear equality constraint in the new variables.

Alternatively, complex legality constraints over many variables can be translated to a set of linear constraints over smaller groups of variables. For instance, in the assignment problem, all pairs of activities can be tested for legality. If an illegal pair is encountered, a constraint is added requiring that only one of the two activities should be assigned to the same person.

The third method takes into account that the machine can handle general nonlinear constraints. If step (2) of the iteration procedure can be efficiently computed, the legality constraint can be implemented directly as a q-function, with no translation.

Figure 7:
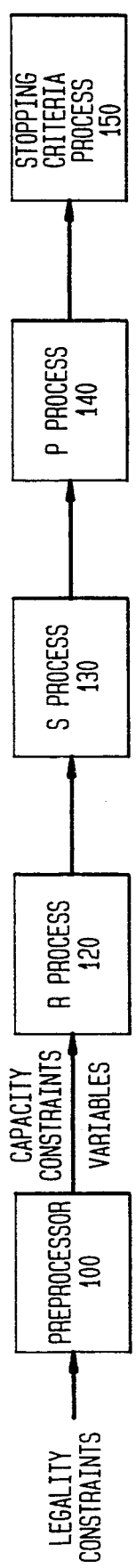
FIG. 7 is a flowchart of the method according to the present invention.

The probabilistic relaxation network technique of the present invention is shown in the flowchart of FIG. 7. Step 10 selects the initial values of the variables $p(x_i)$, that is, the entries in the table of FIG. 3 and sets up the constraints represented by the q-functions, that is, the relationships between the various entries in the table. This step is accomplished in the Preprocessor 100 shown in FIG. 6.

Step 20 in the flowchart of FIG. 7, carried out in the R Process 120 of FIG. 6, calculates the input $r_{ik}(x_i)$ to the arc by dividing away the old output from the current value of $p(x_i)$. This step is carried out in parallel for all i. Step 30 in the flowchart of FIG. 7, carried out in the S Process 130 of FIG. 6, does the actual updating of the influences for each contraint. This step is also carried out in parallel for all i. Step 40 in the flowchart of FIG. 7, carried out in the P Process 140 of FIG. 6, calculates the new values of $p(x_i)$. This step is carried out in parallel for all i. A loop is performed from step 20 through step 40 for all k in parallel. Thus steps 20, 30 and 40 are performed for all k.

Step 50 of the flowchart shown in FIG. 79 determines whether the stopping criteria is satisfied. This is accomplished in the Stopping Processor 150 of FIG. 6. If the stopping criteria is satisfied, a solution has been reached and the process ends, having determined where each crew member is to be assigned on a given day. If the stopping criteria has not been satisfied, steps 20–50 are repeated.

In the Stopping Processor 150, it is determined when no change in the solution is encountered during several consecutive iterations. When a static condition is found, the program stops.

While the present inventors have constructed a new method for solving probabilistic relaxation problems, it is to be understood that the claims of this invention relate only to the application of this novel method to arrangements that determine the optimum allocation of resources in real world technological and industrial systems that lend themselves to a probabilistic representation of the variables and constraints characterizing the system, i.e., physical arrangements that determine how resources are actually applied to optimize the performance of processes, machines, manufactures or compositions of matter. All other uses of the new method, such as computation research, algorithm research, or probabilistic research activities, form no part of the present invention. Similarly, use of the new method in non-technological or non-industrial systems likewise form no part of the present invention.

The foregoing description of the specific embodiments will so fully reveal the general nature of the invention that others can, by applying current knowledge, readily modify and/or adapt for various applications such specific embodiments without departing from the scope of the invention, and, therefore, such adaptations and modifications should and are intended to be comprehended within the meaning and range of equivalents of the disclosed embodiments. It is to be understood that the phraseology of terminology employed herein is for the purpose of description and not of limitation.

What is claimed is:

1. A method of outputting the assignment of available personnel to the plurality of tasks so as to effectively accomplish the tasks, using an apparatus for outputting an optimized assignment of available personnel to a plurality of tasks so as to reduce the cost of accomplishing the tasks using a programmed computer, the apparatus comprising preprocessor means for inputting a plurality of legality constraints and outputting a plurality of capacity constraints and variables which are influenced by the capacity constraints, the preprocessor means including a node generator for generating a plurality of nodes representing each possible assignment, a translator for translating a plurality of legality constraints into compatable q-functions, and an arc generator for generating a plurality of arcs forming constraints on the assignments, wherein the variables represent the nodes and the constraints represent the arcs, the method comprising the steps of:

determining the plurality of tasks to be filled by the available personnel;

assigning costs for each of said tasks;

outputting the plurality of variables and influences on said variables in the form of the capacity constraints, from said plurality of tasks and costs using said preprocessor means;

iteratively updating the influences on said variables using a probabilistic relaxation network technique so as to minimize the total of the costs of said tasks;

terminating said iterative updating steps when the influences remain stable for a predetermined number of iterations;

assigning said personnel to said tasks in accordance with the updated influences; and outputting the assignment of personnel to said tasks.

2. An apparatus for outputting an optimized assignment of available personnel to a plurality of tasks so as to reduce the cost of accomplishing the tasks using a programmed computer, the apparatus comprising:

preprocessor means for inputting a plurality of legality constraints and outputting a plurality of capacity constraints and variables which are influenced by the capacity constraints;

first processor means for calculating inputs for each of the variables to the capacity constraints;

second processor means for updating the influences for each capacity constraint;

third processor means for calculating updated values for the variables;

stopping processor means for determining when a predetermined stopping criteria has been satisfied;

means for assigning the available personnel to the tasks in accordance with the updating values of the variables when the predetermined stopping criteria is satisfied; and output means for outputting the assignments of available personnel to the tasks, wherein said preprocessor means comprises:

a node generator for generating a plurality of nodes representing each possible assignment;

a translator for translating a plurality of legality constraints into computable q-functions; and an arc generator for generating a plurality of arcs forming constraints on the assignments, wherein said variables represent said nodes and said constraints represent said arcs and wherein said arcs and nodes are passed to said first, second, third, and stopping processor means, successively.

3. A method of outputting an optimal allocation of available resources and available facilities using an apparatus for outputting an optimized assignment of available personnel to a plurality of tasks so as to reduce the cost of accomplishing the tasks using a programmed computer, the apparatus including preprocessor means for inputting a plurality of legality constraints and outputting a plurality of capacity constraints and variables which are influenced by the capacity constraints, the preprocessor means including a node generator for generating a plurality of nodes representing each possible assignment, a translator for translating a plurality of legality constraints into computable q-functions, and an arc generator for generating a plurality of arcs forming constraints on the assignments, wherein the variables represent the nodes and the constraints represent the arcs, comprising the steps of:

creating a network of said nodes and said arcs using said preprocessor means, said arcs connecting various ones of said nodes, where the nodes represent assignments of a resource and a facility and the arcs represent constraints on the assignments;

iteratively performing the following steps until a stopping criteria is reached representing that the network is in a stable state;

calculating inputs to the arcs $r_{ik}(x_i)$ disregarding the old outputs from the arcs $s_{ik}(x_i)$;

calculating the influences on the nodes $s_{ik}(x_i)$ based on the inputs to the arcs $r_{ik}(x_i)$; and calculating the new values for the nodes $p(x_i)$ based on the influences on the nodes $s_{ik}(x_i)$;

allocating said resources and facilities in an optimal manner in accordance with the stable state reached by the network; and outputting the optimal allocation of resources and facilities allocated in said step of allocating.

4. The method as set forth in claim 3, wherein the step of iteratively performing is performed for all k in parallel.

5. The method as set forth in claim 4, wherein the inputs to the arcs are calculated in accordance with the formula, for all $i, x_i \epsilon X_k$ in parallel:

$$r_{ik}(x_i) \propto \frac{p(x_i)}{s_{ik}(x_i)}.$$

6. The method as set forth in claim 5, wherein the influences on the nodes are calculated in accordance with the formula, for all $i, x_i \epsilon X_k$ in parallel:

$$s_{ik}(x_i) \propto \sum_{X_k \ x_i} q_k(X_k) \prod_{j, x_j \epsilon X_k \ x_i} r_{jk}(x_j).$$

7. The method as set forth in claim 6, wherein the new values for the nodes are calculated in accordance with the formula, for all $i, x_i \epsilon X_k$ in parallel:

$$p(x_i) \propto r_{ik}(x_i) s_{ik}(x_i).$$

* * * * *